United States Patent
Breau et al.

(10) Patent No.: US 8,499,088 B1
(45) Date of Patent: Jul. 30, 2013

(54) PARALLEL MULTIPLE FORMAT DOWNLOADS

(75) Inventors: Jeremy R. Breau, Leawood, KS (US); Jason R. Delker, Olathe, KS (US); John M. Everson, Leawood, KS (US); Michael A. Gailloux, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 203 days.

(21) Appl. No.: 12/688,551

(22) Filed: Jan. 15, 2010

(51) Int. Cl.
*G06F 15/16* (2006.01)

(52) U.S. Cl.
USPC ........... 709/230; 709/228; 709/229; 709/231; 709/232; 709/217

(58) Field of Classification Search
USPC ......................................... 709/228–232, 217
See application file for complete search history.

(56) References Cited

U.S. PATENT DOCUMENTS

| | | | |
|---|---|---|---|
| 2002/0133626 A1* | 9/2002 | Turnbull | 709/246 |
| 2005/0275566 A1* | 12/2005 | Lahtiranta et al. | 341/22 |
| 2006/0161646 A1* | 7/2006 | Chene et al. | 709/223 |
| 2008/0139112 A1* | 6/2008 | Sampath et al. | 455/3.04 |
| 2009/0006972 A1* | 1/2009 | Karlson et al. | 715/737 |

* cited by examiner

*Primary Examiner* — Umar Cheema

(57) ABSTRACT

A portable electronic device is provided comprising a processor, a memory, a display, and an application stored in the memory that, when executed by the processor, initiates a plurality of user agents that each indicate a different communication point. The portable electronic device also transmits a request for a content from each of the user agents to a content source, the requests being transmitted substantially concurrently. The portable electronic device also receives a plurality of contents, each content associated with one of the user agents and each content formatted differently than the remaining contents. The portable electronic also presents one of the contents on the display, wherein the portable electronic device promotes concurrent downloading of a content in multiple formats from the content source.

19 Claims, 5 Drawing Sheets

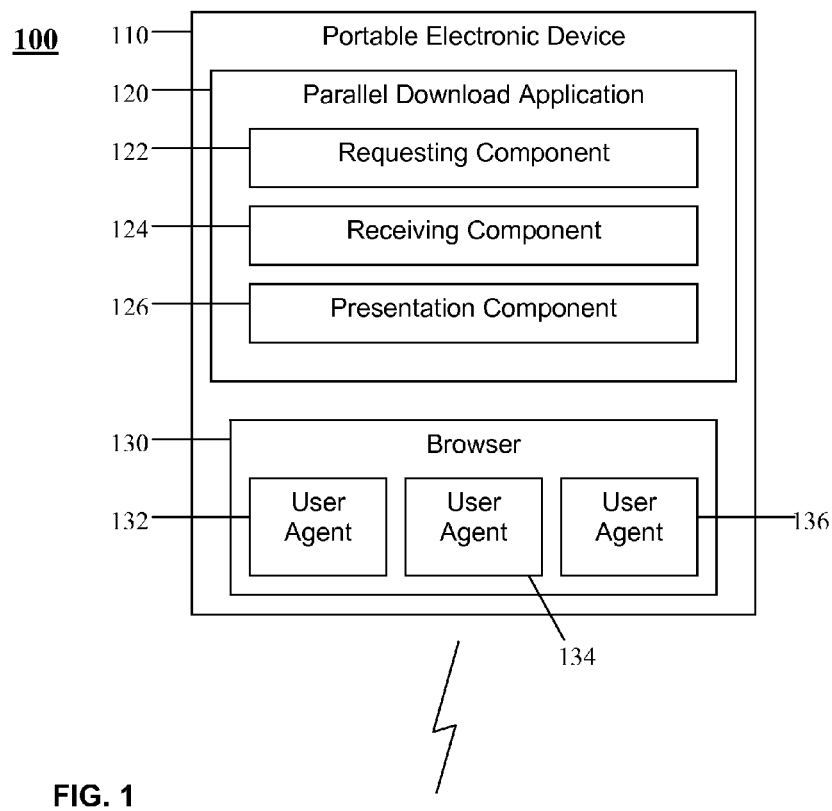
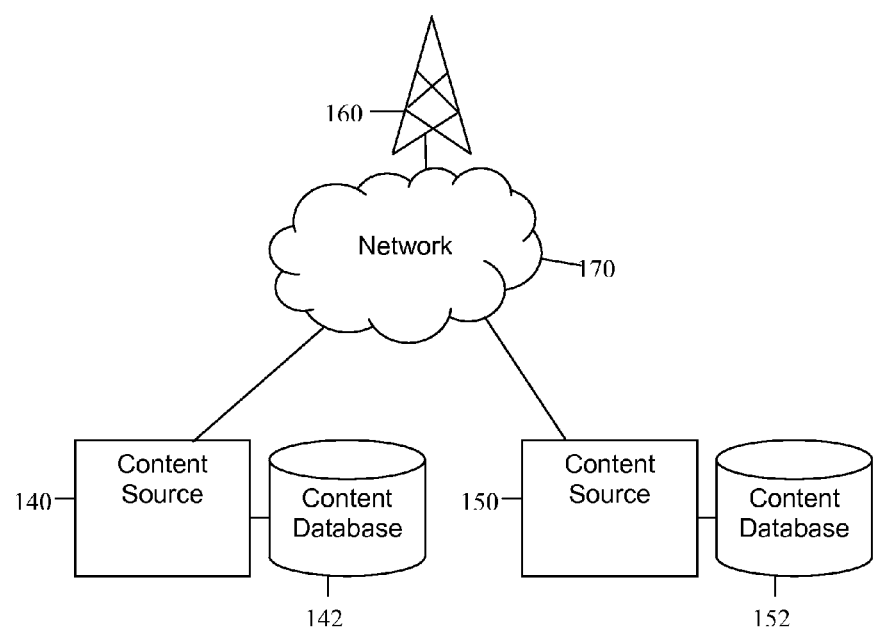
FIG. 1

PARALLEL MULTIPLE FORMAT DOWNLOADS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A browser application is client software used for retrieving, presenting, and traversing information resources on the Internet and other networks. When a browser is executed and establishes contact with a content source, for example an Internet site, the content source may choose a format for presentation of requested content based on the browser. The execution of the browser application may include activation of a user agent component that may be recognized and referred to by the content source in providing the requested content to the browser. The browser may specify hardware display capabilities or requirements of the requesting client device. The browser also may specify a communication point or port for receipt of the requested content. The browser and user agent communicate with content sources using the hypertext transfer protocol (HTTP). The content source may choose the presentation format to use in providing the requested content to the browser. If the content source has only a hypertext markup language (HTML) version of content available, this is the format of the content that the content source delivers. If the content source has multiple presentation formats available of the requested content, the content source may make an arbitrary choice of content to present based on the type of user agent involved in the browser session.

SUMMARY

In an embodiment, a portable electronic device is provided comprising a processor, a memory, a display, and an application stored in the memory that, when executed by the processor, initiates a plurality of user agents that each indicate a different communication point. The portable electronic device also transmits a request for a content from each of the user agents to a content source, the requests being transmitted substantially concurrently. The portable electronic device also receives a plurality of contents, each content associated with one of the user agents and each content formatted differently than the remaining contents. The portable electronic device also presents one of the contents on the display, wherein the portable electronic device promotes concurrent downloading of a content in multiple formats from the content source.

In an embodiment, a processor-implemented method of accessing content is provided. The method comprises a processor in a portable electronic device initiating a first user agent associated with a first content format and the processor initiating a second user agent associated with a second content format. The method also comprises the first user agent transmitting a request for a content identified by an identifier to a content source. The method also comprises the second user agent transmitting a request for the content identified by the identifier to the content source at substantially the same time that the first user agent transmits the request for the content. The method also comprises a browser executed on the processor receiving a content in the first content format and the browser receiving a content in the second content format. The method also comprises the browser presenting one of the content in the first content format and the content in the second content format.

In an embodiment, a portable electronic device is provided comprising a processor, a memory, a display, and an application stored in the memory that, when executed by the processor, initiates a first user agent associated with a binary file content. The portable electronic device also initiates a second user agent associated with a markup language file content. The portable electronic device also transmits a request for a content from each of the user agents to a content source, the requests being transmitted substantially concurrently. The portable electronic device also receives a binary file content and receives a markup language content at about the same time as the binary file content. The portable electronic device also selects one of the binary file content and the markup language content and presents the selected content on the display.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 1 is a block diagram of a system according to an embodiment of the disclosure.

DETAILED DESCRIPTION

Figure 2:
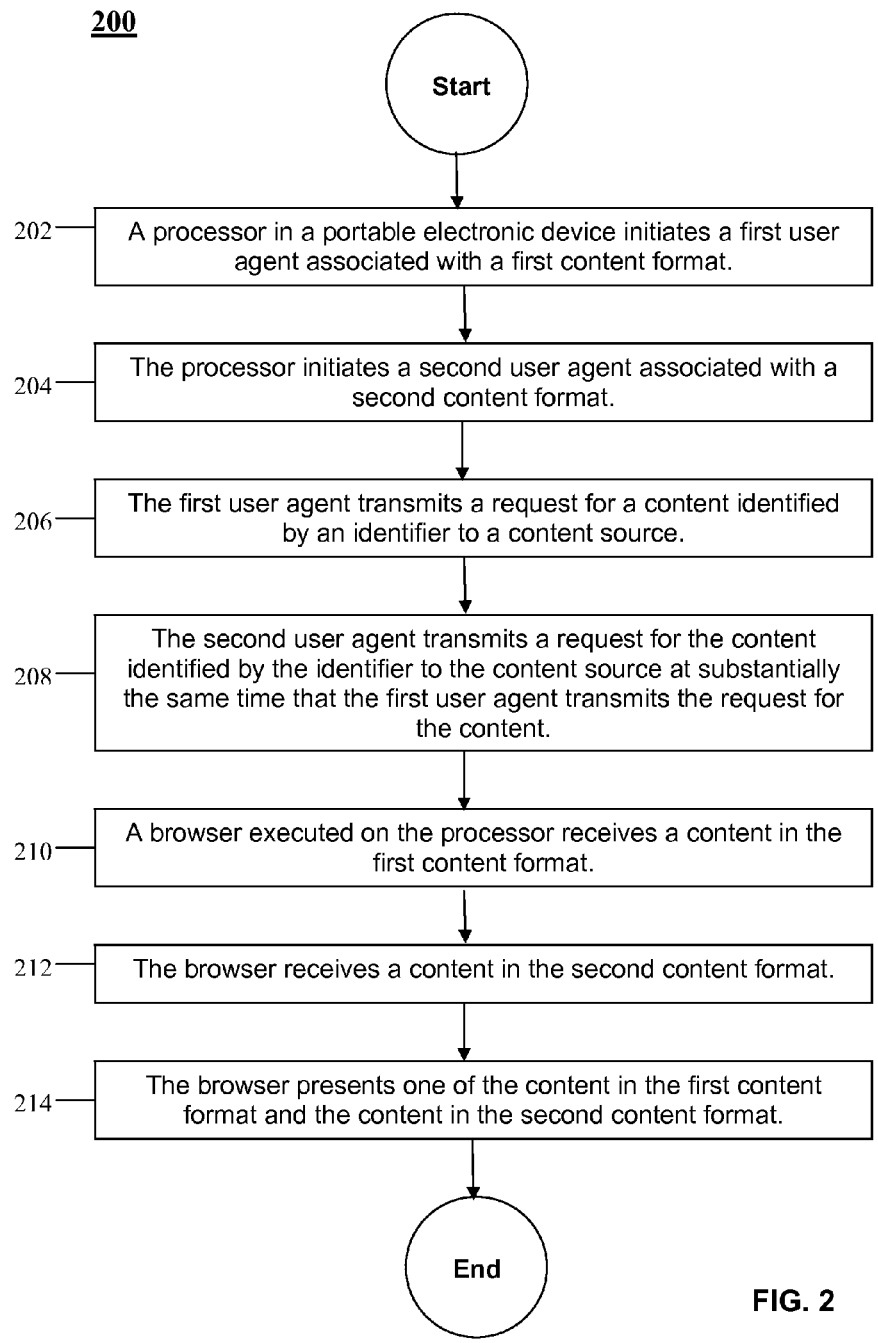
FIG. 2 is a flow chart illustrating a method according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a portable electronic device and parallel download application executing on the device that generates multiple different browser user agents. In an embodiment, a browser session, through the intermediary of multiple user agents, sends a plurality of requests for the same item of content to a content source, for example a web site hosted by a content server. The content source may serve the same requested content to the different user agent requests in a different format, based on inferences the content source may make about the appropriate format to send to each different type of user agent. For example, a first user agent request may be served the content in hyper text markup language (HTML) format, a second user agent request may be served the content in a wireless access protocol (WAP) page format, and a third user agent request may be served the content in a binary image format. A binary file may be thought of as a sequence of bytes of data. In some circumstances, the binary file may provide further information that defines a structure of the file or defines a manner to read and/or interpret the file. For example, the binary image file format may organize data by sections. Each section may contain a section header that specifies the starting address, length, and checksum for that section.

The portable electronic device may locally store the content received in multiple presentation formats and may at its option display the content in its different formats. The portable electronic device may specify a default presentation format. The browser may present the content in the default presentation format and other formats in which the content was received. The user may alternate or toggle between the default format and other formats. The portable electronic device may be unable to display the downloaded content in all formats received because of the device's own hardware and software limitations. The content source may be unable to provide the content in all formats displayable by the portable electronic device due to the content source's own limitations or limitations inherent in the content itself. For example, a web site hosted by a content server may provide the content only in hypertext markup language format. In another example, a web site hosted by a content server may only provide the content in hypertext markup language format and in binary image format. The parallel download application, in these instances, may provide the content in a suitable format available from the content source and displayable by the portable electronic device. The application allows the user to choose the presentation format that best suits the preferences of the user within the limitations of the portable electronic device, the content source, and the content itself.

In addition to allowing a default presentation format to be selected, the application may allow a portable electronic device to specify presentation formats for specific content sources, groups of content sources, and types of content. If content cannot be provided in a default presentation format, the application may provide for a backup format to be used. Some sources of content may only provide the requested content in one presentation format. The parallel download application also learns from the history of user choices and may make projections of user choices when downloading, caching, and presenting content. The parallel download application, for example, may learn that a user chooses to present certain previously recorded theatrical content using a binary presentation format but makes weblog or blog entries to several popular blog sites using the wireless access protocol presentation format. The parallel download application may also learn upon observing user behavior that the user prefers to access sports video and other sports content using the hypertext markup language presentation format.

Turning now to FIG. 1, a system 100 of multiple parallel downloads is provided. The system 100 comprises a portable electronic device 110, a parallel download application 120, a browser 130, user agents 132, 134, 136, content sources 140, 150, content databases 142, 152, a base transceiver system 160, and a network 170.

The portable electronic device 110 may be one of a mobile telephone, personal digital assistant (PDA), media player, and other device with the capability to transmit requests for content to the content source 140. The portable electronic device 110 also receives downloads of content in at least one presentation format, caches the downloaded content, and displays the content. The portable electronic device 110 may have a viewing display of reduced screen size. The portable electronic device 110 supports concurrent downloading of content in multiple presentation formats from the content source 140. While FIG. 1 depicts only one portable electronic device 110, the present disclosure teaches a plurality of portable electronic devices 110.

The parallel download application 120 executes on the portable electronic device 110 and generates multiple user agents 132, 134, 136 associated with the browser 130 when the browser 130 requests content from the content source 140. The browser 130 may have the ability to display content in more than one presentation format. A user of a portable electronic device 110 may wish to select from several presentation formats for displaying the same content. The present disclosure teaches the downloading an item of content from a content source 140 in several different formats. A portable electronic device 110 may have technical capabilities or limitations that make one presentation format preferable over another. Additionally, different users may have different presentation format preferences. The browser 130 when generating a request to the content source 140 may normally generate a single user agent 132 when sending its request to the content source 140. The present disclosure teaches the parallel download application 120 generating multiple user agents 132, 134, 136 from a single browser session.

Each user agent 132, 134, 136 may be associated with a different content format. For example, a first user agent 132 may be designed to interact with content in hypertext markup language format. The second user agent 134 may be designed to interact with content in wireless access protocol format. The third user agent 136 may be designed to interact with content in binary image format. The content source 140 may be able to determine the type of format associated with the user agents 132, 134, 136. For example, the content requests sent by the user agents 132, 134, 136 to the content source 140 may identify the type of user agent sending the content request. The content requests sent by the user agents 132, 134, 136 may contain a parameter explicitly identifying a preferred content format. The content requests sent by the user agents 132, 134, 136 may explicitly identify the subject user agent software by name of the software vendor and/or version number, and the content source 140 may map this information to a preferred content format. The content source 140 may determine the suitable content format for delivering content to user agents 132, 134, and 136 by other techniques. The parallel download application 120 may mimic three separate browser sessions from a single browser session by generating the multiple user agents 132, 134, 136, each user agent 132, 134, 136 associated with its own hypertext transfer protocol request. The three requests associated with the user agents 132, 134, 136 may be seen by the content source 140 as independent and unrelated requests from three separate and independent browsers 130.

The user of the portable electronic device 110 seeking to view online content may enter a uniform resource locator (URL) for an Internet site into the browser 130. The portable electronic device 110 may have technical limitations, requirements, or features, and the content source 140 may make content available with transmission and display specifications that may result in a specific presentation format being preferable for a download of a particular item of content. When the portable electronic device 110 instantiates the browser session and receives the uniform resource locator (URL) of the desired content source 140, the parallel download application 120 may initiate two or three user agents 132, 134, 136 instead of a single user agent 132. The content source 140 receiving browser requests, each associated with a different user agent 132, 134, 136, may infer a presentation format associated with the browser request from examining the particular user agent 132, 134, 136 associated with each browser request. Each presentation format may have different technical attributes that may affect how a portable electronic device 110 displays the downloaded content. The content source 140 may receive the request from the portable electronic device 110 as three separate hypertext transfer protocol requests and may respond to the three requests with the requested content in three separate presentation formats if the content source 140 is able.

As the browser 130 receives the requested content in its different formats, the parallel download application 120 may separately store or cache the received content in each format. While the browser 130 may at any one time display the content using only one of the downloaded formats, the downloaded content may remain cached in each of the formats and available for display at the option of the user. The parallel download application 120 may display the content using a default format specified by the user of the portable electronic device 110. The parallel download application 120 may contain functionality permitting the user to toggle between different formats and choose the presentation format that best suits the technical specifications and display capabilities of the portable electronic device 110, the technical and aesthetic nature of the content, and the preferences of the user. The portable electronic device 110 may specify a default display format for content downloaded from certain content sources 140, 150. The parallel download application 120 may permit specification of default presentation formats for groups of content sources 140, 150 and types of content, for example content that is interactive, displays animation, or plays music or other audible content. The parallel download application 120 may learn the display preferences of the user of the portable electronic device 110 and may sequence the toggling order of display formats in the order usually chosen by the user. The portable electronic device 110 may specify a default presentation format for a specific world wide web Internet site or domain. A default presentation format for a site may be specified because the user of the portable electronic device 110 learns over a period of time that the content provided by the site is best viewed using one particular presentation format. For example, a user of a portable electronic device 110 may discover after several attempts that content from an Internet site that provides sports content is best viewed when using a hypertext markup language presentation format instead of the binary or the wireless access protocol (WAP) presentation format.

The parallel download application 120 comprises the requesting component 122 that interacts with the browser 130 and may activate multiple user agents 132, 134, 136 when a browser session is instantiated on the portable electronic device 110. Each of the multiple user agents 132, 134, 136 may be associated with a different presentation format. The portable electronic device 110 may store frameworks or templates of each of the user agents 132, 134, 136, each containing coding that may result in the content source 140 inferring a preferred presentation format from the particular user agent 132, 134, 136. Traditional browsers 130 may activate a single user agent 132 when a browser session is started. The requesting component 122 may configure the user agent 132 to suggest or induce the content source 140 to infer technical specifications for the content requested or technical information about the display capability of the portable electronic device 110. The requesting component 122 may configure the user agent 132 to indicate a formal standard that the content source 140 may recognize or infer and use to access content from a content database 142. The requesting component 122 may configure the user agent 132 to also provide a communication point or port on the portable electronic device 110 through which the requested content may be delivered.

The portable electronic device 110 executing the parallel download application 120 may only need to instantiate a browser session as it would if the parallel download application 120 was not executing. The user may need to take no extra steps to request content in multiple formats. The requesting component 122 may intervene in the browser session after the uniform resource locator (URL) has been entered and the browser 130 begins steps to contact the content source 140 associated with the uniform resource locator (URL). At around the time that the browser 130 activates a first user agent 132, the requesting component 122 intervenes and activates at least a second user agent 134 and perhaps a third user agent 136. The same uniform resource locator is designated in each virtual browser session. The second and third user agents 134, 136 may be configured such that the content source 140 may infer different display specifications than the display specification inferred from examining the first user agent 132. The second and third user agents 134, 136 may effectively mimic or pretend to be other browsers or portable electronic devices 110 and thereby cause the content source 140 to recognize the second and third user agents 134, 136 as different from the first user agent 132 and provide requested content in different presentation formats than provided to the first user agent 132.

Each of the user agents 132, 134, 136 may identify a communication point or port of the portable electronic device 110 through which the requested content may be received. The communication points associated with each of the user agents 132, 134, 136 are different. The browser 130 in its three virtual sessions requests the same content by entering the same uniform resource locator. Because the user agent 132, 134, 136 associated with each of the three virtual browser sessions is different, the content that is received may be of the same or similar substance from the perspective of the user but also may be of different format or form because the browser 130 may render or display each version of content differently. The content requested is the same. For example, an article on yesterday's National Football League game may be delivered in any of a hypertext markup language format, a wireless access protocol page format, and a binary image format. In this example, the underlying content—the information about the game—may be said to be the same while the format of the content is different.

The display specifications associated with each of the user agents 132, 134, 136 may be configured in advance by the user of the portable electronic device 110. Configuration may be done through an interface provided by the parallel download application 120. In an embodiment, the display specifications could be set for each user agent 132, 134, 136 at the time that a browser session is instantiated although this method may require several exchanges of transmissions and may be time consuming and inconvenient. The requesting component 122, in activating the multiple user agents 132, 134, 136, may not need to create the complete user agents 132, 134, 136 with all software code elements. The requesting component 122 may only need to generate the portions of the user agents 132, 134, 136 that may suggest the separate display specifications and induce the content source 140 to receive, process, and reply to the browser requests as three separate requests instead of one request. The content source 140 may neither know nor care that the three separate requests were generated by one browser session executing on the single portable electronic device 110.

The parallel download application 120 also comprises the receiving component 124 that takes delivery of the requested electronic content received from the content source 140. The receiving component 124 separately caches the received content locally on the portable electronic device 110. When content downloads from the content source 140 are received by the portable electronic device 110, the receiving component 124 examines the content contained in each reply and determines the presentation format used for each reply. While the content is described herein as being requested and received in at least one of hypertext markup language (HTML) format, a binary file format, and a wireless application protocol (WAP) page format, the present disclosure teaches that the content may be requested and received in other display formats. The receiving component 124 may cache the received content in its various formats for specific periods of time depending on how configured.

The parallel download application 120 also comprises the presentation component 126 that presents or renders the requested content in the display of the portable electronic device 110. Depending on the preferences configured by the user of the portable electronic device 110 and the technical capabilities of the portable electronic device 110, the presentation component 126 displays the content received by the receiving component 124. The presentation component 126 may consult configuration instructions stored in the portable electronic device 110 to determine a default presentation format specified by the user. The portable electronic device 110 then displays the content specified in that format. The presentation component 126 may not be able to display the content in the default format for several reasons. The content source 140 may have been unable to supply the content in the default format. The portable electronic device 110 may not presently have the technical capability to display the content in the default format. The content in the default format may have been generated and sent by the content source 140 but failed to arrive at the portable electronic device 110 in acceptable condition or at all. If, for any of these reasons or for some other reason, the content cannot be displayed using the default format, presentation component 126 may display the content using an alternate or other format in which content was received and cached by the receiving component 124.

The presentation component 126 may allow the user to toggle or switch between two or more presentation formats of content cached in the portable electronic device 110. This may provide the user the opportunity to determine the presentation format most preferable for that item of content. A user's order of preferences for presentation formats as well as any preferences for settings within individual formats is stored in the portable electronic device 110. In an embodiment, information about some of the display preferences for a portable electronic device 110 may be stored in another device, for example in a server or database located elsewhere.

The presentation component 126 may examine items of content frequently downloaded by the portable electronic device 110 and may determine that some of the same Internet web "pages" are downloaded and clicked or navigated through on the way to other destination content pages that are then viewed or otherwise consumed or interacted with. The presentation component 126 on a semi-permanent basis may cache those intermediate or pass-through pages and maintain the pages in their predetermined sequence. When the portable electronic device 110 then later requests the content again in a browser session, the parallel download application 120 may not take delivery of those recurring intermediate pages because they are already in cache but take delivery of the destination pages that may change more frequently and are of more value to the user. The presentation component 126 then sequences the previously cached intermediate pages with the newly received content pages for presentation. The process of combining some cached intermediate pages with freshly downloaded content pages in various sequences may not be apparent to the user. Requested pages may be classified and segregated in a first group as those used for access, input and navigation and a second group as those used for consumption and interaction. Pages in the first group may be presented using the wireless access protocol (WAP) presentation format because they are used to request content, input data, and navigate or pass through to destination sites. Pages in the second group may be presented using the binary or hypertext markup language presentation formats because their content may be destination content and viewed, interacted with, and otherwise consumed by the user of the portable electronic device 110. Pages in the first group may be more likely subject to caching for extended periods because the pages are passed through and may not be of primary interest to the user. Pages in the second group are likely to be of greater interest to the user and may be more frequently updated and receive priority in being provided storage and processing resources.

For a certain item of content that involves the display of a sequence of pages, the presentation component 126 may determine that some pages may be better presented using one format and other pages should be presented in another format. These determinations depend on the type of material being displayed in the page and the likelihood that the user will be transiting through the page without viewing or otherwise using the content. This may permit the presentation component 126 to remove some content from intermediate pages that are not actively used, thereby saving storage space and processor capacity and improving speed of display of content. The wireless access protocol (WAP) presentation format may be used for presenting such intermediate pages.

For a given page of content displayed, the presentation component 126 may deduce from actions by the user at that page what format to use for following pages. For example, an Internet web page may provide a user the choice of signing in to the associated Internet site using a user name and a password or bypassing authentication and examining or consuming general publicly viewable content. The presentation component 126 may display subsequent pages in the presented item of content using different presentation formats depending on whether the user signed in or did not sign in because the user's actions on the initial sign-in page may suggest the user's actions at subsequent pages. If the user is likely to be consuming content at a certain page, the presentation component 126 may project how the user will be doing so and may use this projection to determine the presentation format for that page and pages that may follow. The downloading of content in multiple formats and the accessibility of the content in local cache may allow the presentation component 126 to rapidly make these determinations in a manner that may not be perceptible to the user. By observing repeated user behaviors with specific pages and types of pages, the presentation component 126 may infer user behavior and preferences and develop shortcuts and rules of thumb for presenting content using various presentation formats.

Because of the wide variety of content available on the Internet and other networks, certain types of web page content may be more suitable for certain presentation formats than other presentation formats. In addition, as previously discussed, a user's intended purpose for a particular web page may have a bearing on the best choice of presentation format. A user downloading content that contains active, motion picture images, for example, may find it best to have that content presented in a different format than content that contains boxes or spaces for data entry. For each of the many types of content that may be downloaded, one or several presentation formats may be preferable and other presentation formats may not be desirable or even acceptable.

When the portable electronic device 110 is accessing a web page that is used solely to enter text and be submitted back to the web site from which the web page originated, a simple presentation format may be needed. An example may be a web page of a large organization that is presented when the user of the portable electronic device 110 makes a selection from the web page entitled "Contact Us." The portable electronic device 110 receives a web page that permits the user to enter a question, comment, or complaint with identifying information about the user. Another similar example may be a web page in which the user is registering with the organization for some purpose and entering name, address, and other data. Since the purpose of these types of web pages is primarily data entry and not viewing of content, the wireless access protocol (WAP) presentation format may be the best presentation format in this situation. Because the wireless access protocol (WAP) presentation format does not typically present images, it may be the most efficient and therefore preferred presentation format for the portable electronic device 110 in this situation.

When the portable electronic device 110 is accessing and downloading content that comprises active or motion-picture media that may be viewable using zoom in and zoom out features, a binary presentation format may be preferable. Because a browser 130 that uses a binary presentation format may behave like media playing software with image mapping functionality, the binary presentation format may be the preferred format when the portable electronic device 110 is accessing video clips for immediate or subsequent viewing.

When the portable electronic device 110 is accessing and downloading content that may comprise live streamed media or may contain embedded Internet links that may change, the hypertext markup language presentation format may be preferable. For the type of experience that the user of the portable electronic device 110 is requiring, the hypertext markup language may be the ideal, preferable, or only format that provides the experience or meets the requirements of the user.

When the presentation component 126 is presenting a series or succession of web pages that comprises the intermediate or pass-through pages of less utility and the destination or content pages of greater utility to the user of the portable electronic device 110, the intermediate pages may be presented using a presentation format such as the wireless access protocol (WAP). Since the intermediate pages may not be viewed by the user of the portable electronic device 110 with much or any interest, it may not be necessary to present the full content of the intermediate pages. The user may never scroll down and view the content in the intermediate pages and it therefore may not be of practical value to download and render the content in those intermediate pages. While the user may have the choice of how web pages are presented, the parallel download application 120 may learn the user's viewing habits of various web pages and present the content using the presentation format projected to be most likely chosen by the user. The parallel download application 120 may determine the presentation format to use based on the type of content in a downloaded web page and observed user behavior toward the web page if downloaded previously and toward web pages similar to the type downloaded and being presented.

The browser 130 is a software application executing on the portable electronic device 110 that makes requests to the content source 140 for downloaded content. While the present disclosure teaches the browser 130 making requests using the hypertext transport protocol (HTTP), in an embodiment the browser 130 may use a different transport protocol and a different underlying suite of communication protocols than transport control protocol/internet protocol (TCP/IP). The user agents 132, 134, 136 associated with the browser 130 may be referred to as the first user agent 132, the second user agent 134, and the third user agent 136, respectively.

Content sources 140, 150 are servers and other devices that receive and respond to content requests from the portable electronic device 110 using the hypertext transport protocol and other communication protocols. Content sources 140, 150 may have the capacity to provide requested content in each of the presentation formats specified by the portable electronic device 110. Content sources 140, 150 alternatively may be unable to provide requested content in all presentation formats due to technical or other limitations of the content sources 140, 150 or limitations inherent in the content itself. Content sources 140, 150 may be web servers accessible on the world wide web of the Internet. Content sources 140, 150 may be servers that provide content on private networks. Content databases 142, 152 are associated with content sources 140, 150, respectively, and store content for distribution by the content sources 140, 150 to the requesting portable electronic device 110. Content sources 140, 150 may be servers that host "web sites" accessible on the world wide web of the Internet. Content sources 140, 150 may provide content in only one presentation format, may provide content in two presentation formats, or may provide content in three or more presentation formats.

The base transceiver station 160 may be any of a cellular wireless base station, for example a Code Division Multiple Access (CDMA), Global System for Mobile Communications (GSM), Universal Mobile Communications System (UMTS), and/or Long-term Evolution (LTE) cellular wireless base station; a World-wide Interoperable Microwave Access (WiMAX) base station; a WiFi access point; a femtocell; or other wireless access devices. While FIG. 1 depicts only one base transceiver station 160, in an embodiment a plurality of base transceiver stations 160 may be existent and in operation.

The network 170 promotes communication between the components of the system 100. The network 170 may be any communication network including a public data network (PDN), a public switched telephone network (PSTN), a private network, and/or a combination thereof.

Turning now to FIG. 2, a processor-implemented method 200 of accessing content is provided. Beginning at block 202, a processor in a portable electronic device 110 initiates a first user agent 132 associated with a first content format, for example a markup language file format. At block 204, the processor initiates a second user agent 134 associated with a second content format, for example a wireless application protocol format.

At block 206, the first user agent 132 transmits a request for a content identified by an identifier to a content source 140.

The identifier may be the uniform resource locator of the item of content entered into the browser 130 with which the first user agent 132 is associated.

At block 208, the second user agent 134 transmits a request for the content identified by the identifier to the content source 140 at substantially the same time that the first user agent 132 transmitted its request for the content. The browser 130 when associated with the second user agent 134 may send its request using the same uniform resource locator as it does when associated with the first user agent 132 at block 206.

From blocks 202 through 208, the parallel download application 120 initiates the first and second user agents 132, 134, each associated with a different content format, from a single browser session and almost simultaneously transmits requests for the same content from the content source 140. The parallel download application 120 generates two hypertext transport protocol transmissions from one browser session to spoof or masquerade as two browser sessions.

At block 210, the browser 130 executing on the processor of a portable electronic device 110 receives a content in the first content format and at block 212, the browser 130 receives a content in the second format. The content received at blocks 210 and 212 may be nearly identical content with some elements of the content added or removed from the respective contents to accommodate the requested presentation formats.

At block 214, the browser 130 presents one of the content in the first content format and the content in the second content format. The portable electronic device 110 may have specified a default presentation format. The parallel download application 120 causes the content to be displayed in that format. If no default format is specified, the user may be presented a choice of presentation formats. It a default format is specified but the content cannot be displayed using that format, the parallel download application 120 may display the content in the other presentation format in which the content was downloaded.

At about the same time as the actions at blocks 202 through 206, the portable electronic device 110 may initiate a third user agent 136 associated with a binary file format. The browser 130 when associated with the third user agent 136 may transmit a request to the content server 140 for the same content that was associated with the first and second user agents 132, 134 by entering the same uniform resource locator into the browser 130. Assuming it is able to provide the content in binary file format, the content server 140 responds to the request of the browser 130 when associated with the third user agent 136 by providing the content in binary file format. The browser 130 may then present one of the content in markup language file format and wireless application protocol page format as described in the method 200 as well as in binary file format.

The parallel download application 120 may select one of the contents for display based on one of an identity of the content and an identity of the content source 140. The transmitting and receiving of messages between the portable electronic device 110 and the content source 140 may be accomplished at least in part over wireless links.

Figure 3:
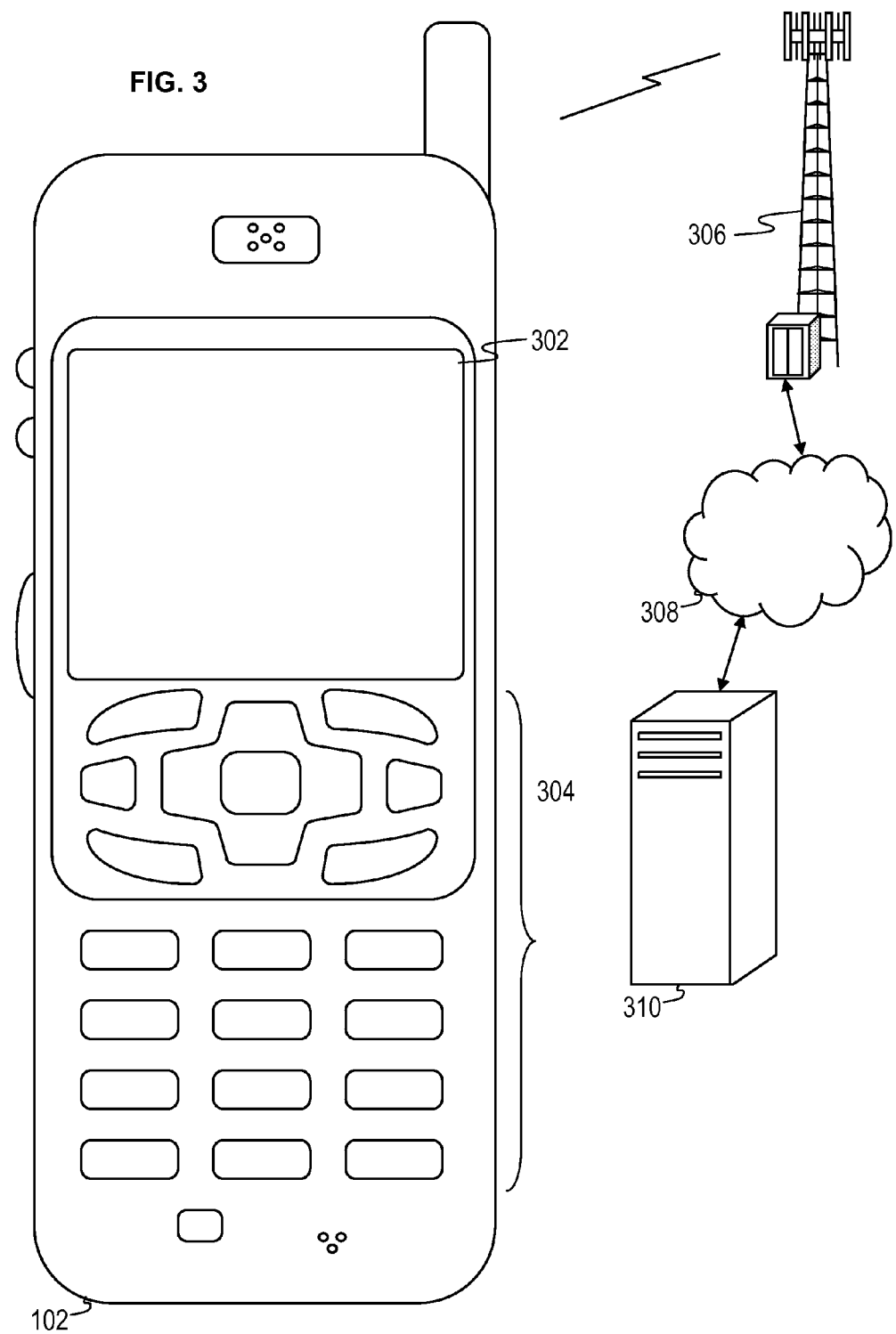
FIG. 3 is an illustration of a mobile device according to an embodiment of the disclosure.

FIG. 3 shows a wireless communications system including the mobile device 102. FIG. 3 depicts the mobile device 102, which is operable for implementing aspects of the present disclosure, but the present disclosure should not be limited to these implementations. The mobile device 102 may in some embodiments exemplify the portable electronic device 110 described in the system 100. Though illustrated as a mobile phone, the device 102 may take various forms including a personal computer, a mobile computer, a portable computer, a tablet computer, a laptop computer, and a desktop computer.

The device 102 may take various forms with a screen size reduced to a maximum of 4 inches by 6 inches, including a mobile telecommunication device, a mobile handset, a personal digital assistant (PDA), a handheld gaming device, a handheld wireless mobile device, a pager, a digital camera, a digital music player, a digital calculator, and other portable electronic devices. The operator of the portable electronic device may select content formats based on the reduced screen size. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 302 and a touch-sensitive surface and/or keys 304 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 302 to show a web page. The web page may be obtained via wireless communications with a base transceiver station (BTS) 306, a wireless network access node, a peer mobile device 102 or any other wireless communication network or system. While a single base transceiver station 306 is illustrated, it is understood that the wireless communication system may comprise additional base transceiver stations. In some instances, the mobile device 102 may be in communication with multiple base transceiver stations 306 at the same time. The base transceiver station 306 (or wireless network access node) is coupled to a wired network 308, such as the Internet. Via the wireless link and the wired network, the mobile device 102 has access to information on various servers, such as a server 310. The server 310 may provide content that may be shown on the display 302. Alternately, the mobile device 102 may access the base transceiver station 306 through a peer mobile device 102 acting as an intermediary, in a relay type or hop type of connection.

Figure 4:
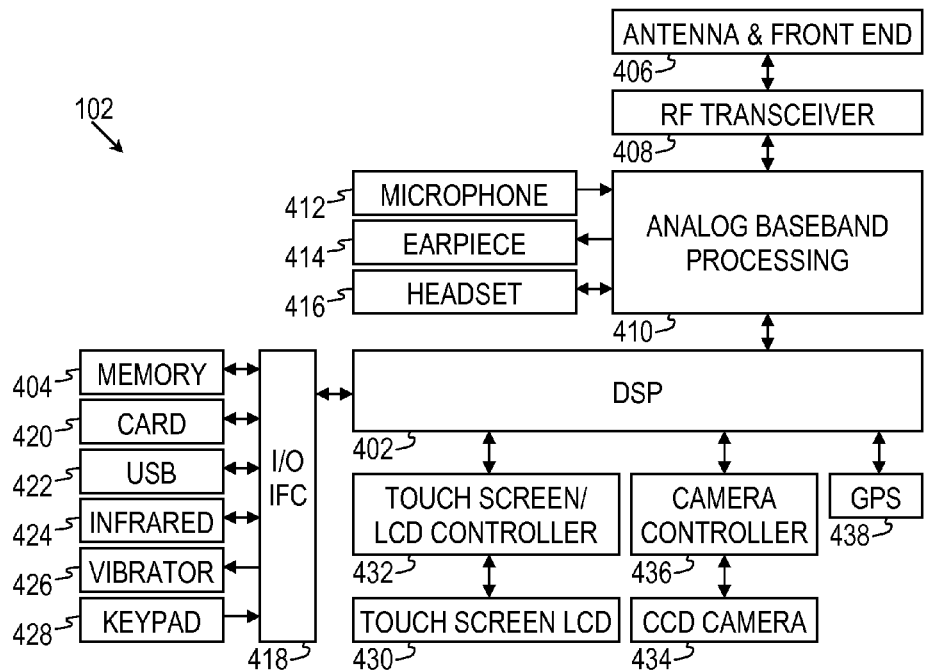
FIG. 4 is a block diagram of a mobile device according to an embodiment of the disclosure.

FIG. 4 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 402 and a memory 404. As shown, the mobile device 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the mobile device 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the mobile device 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 102 to send and receive information from a radio access network (RAN) or some other available wireless communications network or from a peer mobile device 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the mobile device 102 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the mobile device 102 to function as a peripheral device to exchange information with a personal computer or other computer system. The infrared port 424 and other optional ports such as a Bluetooth interface or an IEEE 802.11 compliant wireless interface may enable the mobile device 102 to communicate wirelessly with other nearby handsets and/or wireless base stations.

The input/output interface 418 may further connect the DSP 402 to the vibrator 426 that, when triggered, causes the mobile device 102 to vibrate. The vibrator 526 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the mobile device 102. Another input mechanism may be the touch screen LCD 430, which may also display text and/or graphics to the user. The touch screen LCD controller 432 couples the DSP 402 to the touch screen LCD 430.

The CCD camera 434 enables the mobile device 102 to take digital pictures. The DSP 402 communicates with the CCD camera 434 via the camera controller 436. The GPS sensor 438 is coupled to the DSP 402 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 5:
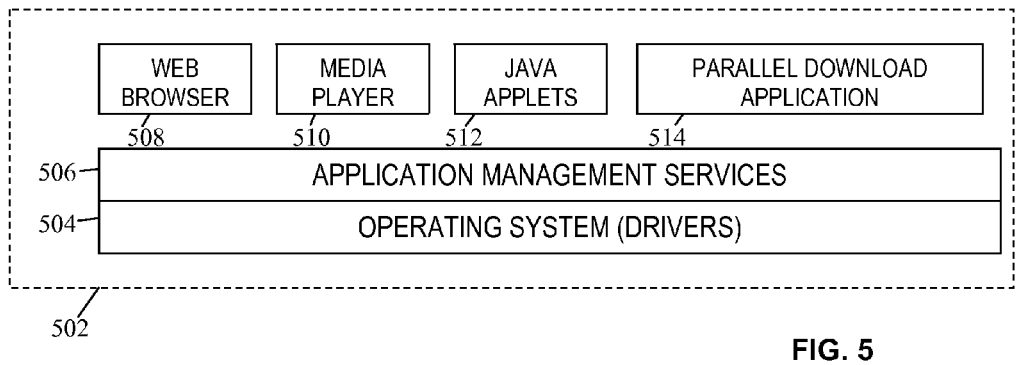
FIG. 5 is a block diagram of a software configuration for a mobile device according to an embodiment of the disclosure.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the mobile device 102. Also shown in FIG. 5 are a web browser application 508, a media player application 510, and JAVA applets 512. The web browser application 508 configures the mobile device 102 to operate as a web browser, allowing a user to enter information into forms and select links to retrieve and view web pages. The media player application 510 configures the mobile device 102 to retrieve and play audio or audiovisual media. The JAVA applets 512 configure the mobile device 102 to provide games, utilities, and other functionality. The parallel download application 514 may in some embodiments exemplify the parallel download application 120 described in the system 100.

Figure 6:
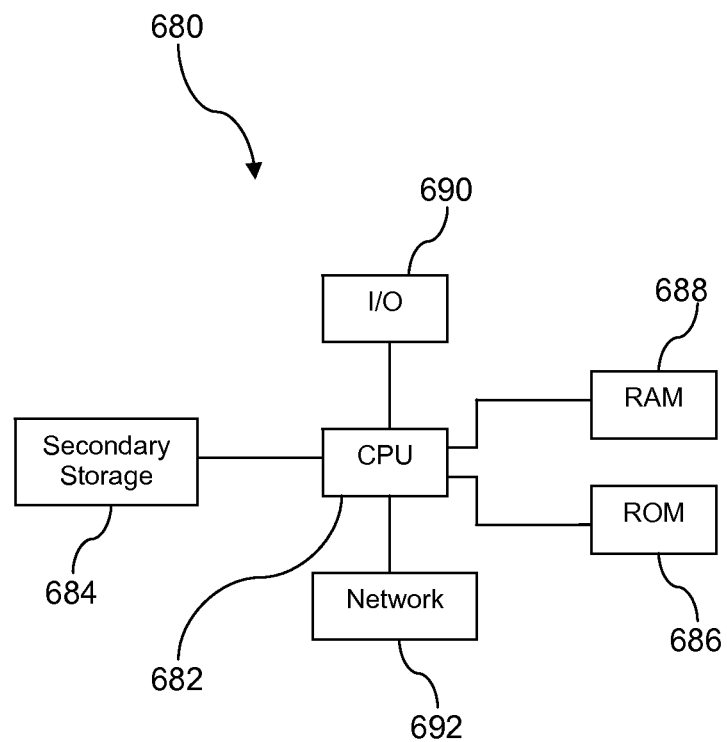
FIG. 6 illustrates an exemplary computer system suitable for implementing some aspects of the several embodiments of the disclosure.

FIG. 6 illustrates a computer system 680 suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data in part by directly accessing the computer program product, for example by reading from a CD-ROM disk inserted into a disk drive peripheral of the computer system 680. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A portable electronic device, comprising:
   a processor;
   a memory;
   a display; and
   an application stored in the memory that, when executed by the processor,
   initiates a plurality of user agents that each indicates a different communication point on the portable electronic device, wherein each of the user agents is associated with a different content format of a plurality of different content formats, and wherein the plurality of different content formats includes a markup language file format, a wireless access protocol (WAP) page format, and a binary file format,
   transmits a request for a content from each of the user agents to a content source, the requests being transmitted in response to receiving an identifier for the content,
   receives a plurality of contents from the content source, each content associated with one of the user agents and each content formatted differently according to the format associated with the corresponding user agent, wherein the plurality of contents represents the same item of content in different formats, and wherein the plurality of contents is concurrently downloaded from the content source, and
   presents one of the plurality of contents on the display based on a learned presentation format for a content type of the content, wherein the learned presentation format is determined by the application based on a history of user selected presentation formats for the content type.

2. The portable electronic device of claim 1, wherein the portable electronic device is one of a mobile phone, a personal digital assistant, or a media player.

3. The portable electronic device of claim 1, wherein the display has a reduced screen size.

4. The portable electronic device of claim 1, wherein the application selects another one of the plurality of contents for display based on a default configuration.

5. The portable electronic device of claim 1, wherein the application selects the one of the plurality of contents for display further based on one of an identity of the content or an identity of the content source.

6. The portable electronic device of claim 1, wherein the application further presents an interface for selecting presentation of a format, the application receives an input selecting the format, and the application selects another one of the plurality of contents for display based on the content formats and on the input selecting the format.

7. The portable electronic device of claim 1, wherein each of the requests comprises the same identifier and wherein the identifier comprises the universal reference locator (URL) for the content.

8. The portable electronic device of claim 1, wherein the application receives and stores a first content and subsequently presents the first content with a second content presented one of immediately upon or shortly after receipt and wherein the first content and the second content are presented using different formats.

9. A processor-implemented method of accessing content, comprising:
   initiating, by a processor in a portable electronic device, a first user agent associated with a markup language file format;
   initiating, by the processor, a second user agent associated with a wireless access protocol (WAP) page format;
   initiating, by the processor, a third user agent associated with a binary file format, wherein each of the first user agent, the second user agent, and the third user agent is associated with a different content format;
   transmitting, by the first user agent, a request for a content identified by an identifier to a content source in response to receiving the identifier for the content;

transmitting, by the second user agent, a request for the content identified by the identifier to the content source in response to receiving the identifier for the content;

transmitting, by the third user agent, a request for the content identified by the identifier to the content source in response to receiving the identifier for the content;

receiving, by a browser executed on the processor, a content in the markup language file format from the content source;

receiving, by the browser, a content in the wireless access protocol page format from the content source;

receiving, by the browser, a content in the binary file format from the content source, wherein the content in the markup language file format, the content in the wireless access protocol page format, and the content in the binary file format represent the same item of content in different formats, and wherein the content in the markup language file format, the content in the wireless access protocol page format, and the content in the binary file format are concurrently downloaded from the content source; and presenting, by the browser, one of the content in the markup language file format, the content in the wireless access protocol page format, or the content in the binary file format based on a learned presentation format for a content type of the content, wherein the learned presentation format is determined based on a history of user selected presentation formats for the content type.

10. The method of claim 9, wherein the browser presents the content on a display having a reduced screen size.

11. The method of claim 9, wherein the transmitting and receiving are accomplished at least in part over wireless links.

12. The method of claim 11, wherein the wireless links are provided by at least one of code division multiple access (CDMA) wireless technology, global system for mobile communication (GSM) wireless technology, long-term evolution (LTE) wireless technology, or worldwide interoperability for microwave access (WiMAX) wireless technology.

13. The method of claim 9, further comprising selecting one of the markup language file format, the wireless access protocol page format, and the binary file format for presenting based on one of a user input, a default configuration, or an identity of the content source.

14. A portable electronic device, comprising:
a processor;
a memory;
a display; and
an application stored in the memory that, when executed by the processor, initiates a first user agent associated with a binary file content, initiates a second user agent associated with a markup language file content, initiates a third user agent associated with a wireless access protocol page content, wherein each of the first user agent, the second user agent, and the third user agent is associated with a different content format, and wherein the binary file content, the markup language file content, the wireless access protocol page content represent the same item of content in different formats, transmits a request for a content from each of the user agents to a content source, the requests being transmitted in response to receiving an identifier for the content, receives the binary file content from the content source, receives the markup language content from the content source and the wireless access protocol page content from the content source at the same time as the binary file content, selects one of the binary file content, the markup language content, or the wireless access protocol page content based on a learned presentation format for a content type of the content, wherein the learned presentation format is determined by the application based on a history of user selected presentation formats for the content type, and presents the selected content on the display.

15. The portable electronic device of claim 14, wherein the application selects another one of the binary file content, the markup language content, or the wireless access protocol page content based on a default configuration.

16. The portable electronic device of claim 15, wherein the default configuration is one of a general default or a default associated with a specific content source.

17. The method of claim 9, further comprising selecting the one of the markup language file format, the wireless access protocol page format, and the binary file format for presenting based on an identity of the content.

18. The portable electronic device of claim 15, wherein the application selects the one of the binary file content, the markup language content, or the wireless access protocol page content further based on an identity of the content.

19. The portable electronic device of claim 15, wherein the application selects the one of the binary file content, the markup language content, or the wireless access protocol page content further based on an identity of the content source.

* * * * *